United States Patent [19]

Gayfer et al.

[11] Patent Number: 5,387,030
[45] Date of Patent: Feb. 7, 1995

[54] PLURAL SERVICE RATE SENSITIVITY CONTROL VALVE

[75] Inventors: Robert Gayfer; Heinz-Jürgen Listl, both of Watertown, N.Y.

[73] Assignee: Knorr Brake Holding, Westminster, Md.

[21] Appl. No.: 118,737

[22] Filed: Sep. 10, 1993

[51] Int. Cl.⁶ .............................................. B60T 17/06
[52] U.S. Cl. ........................................ 303/30; 303/39; 303/900
[58] Field of Search ................. 303/28, 27, 30, 35, 303/33, 32, 38, 39, 40–42, 58, 64, 118.1, DIG. 1, DIG. 2, 900

[56] References Cited

U.S. PATENT DOCUMENTS

| | | | |
|---|---|---|---|
| 2,077,788 | 4/1937 | Goodknight | 303/27 |
| 3,545,820 | 12/1970 | Scott | 303/28 |
| 4,536,040 | 8/1985 | Eder | 303/37 |
| 4,848,849 | 7/1989 | Epp et al. | 303/37 X |
| 4,850,654 | 7/1989 | Hart et al. | 303/37 X |

Primary Examiner—Robert J. Oberleitner
Assistant Examiner—Alfred Muratori
Attorney, Agent, or Firm—Barnes & Thornburg

[57] ABSTRACT

A control valve having, in a series with a first inlet valve of a quick brake volume, two different rates of flow restrictions operable as a function of the position of the piston. The first flow rate of one first restriction is insufficient to cause the piston to a braking position for applying a minimum service application for first range of piston positions which would generally be produced by the mechanical vibration. The second restriction has a greater flow and will accelerate the piston to a braking position for a second range of piston positions which will be produced by the reduction of the brake pipe pressure on one face of the piston. By providing two flow rates, the valve becomes insensitive to mechanically produced forces while maintaining the reaction time of the valve to fluidically produced reduction of brake pipe pressure.

20 Claims, 6 Drawing Sheets

PLURAL SERVICE RATE SENSITIVITY CONTROL VALVE

SUMMARY OF THE INVENTION

The present invention relates generally to brake control valve systems for operating a vehicle's air brakes, in response to brake pipe pressure in a brake pipe, and more specifically to a brake control valve system which is insensitive to increased mechanical vibrations.

Brake control valve systems for a vehicle having air brakes generally include a brake control valve responsive to the brake pipe pressure in a brake pipe to operate the brakes of a vehicle. For a reduction of brake pipe pressure, the brakes are proportionally applied. For an increase in brake pipe pressure, the brakes may be released totally or gradually. In the AAR system, the brake control valves include a service section and an emergency section which are responsive respectfully to a service rate of reduction and emergency rate of reduction to apply the brakes appropriately. Each section includes a separate diaphragm responsive to the brake pipe pressure on one side and a reference pressure on the other. Not only must the brake control valve differentiate between a service and an emergency application, but also must react in a specific amount of time to apply the brakes and propagate the signal throughout the brake system.

Historically the control valves have been designed to be substantially insensitive to pneumatic noise signals in the brake pipe which could cause undesired emergency (UDE) braking and undesired release (UDR). Various mechanisms have been used, for example, chokes or restrictions interconnecting the brake pipe and the reference chamber of the diaphragms, to accommodate pneumatic noise. The pneumatic noise or shock is produced by the mechanical vibration of the vehicle. A major identifiable source of this mechanical vibration is in the longitudinal motion or slack action between the different cars of the vehicle or train. The insensitivity or the stability built into the brake control valves to accommodate the pneumatic noise or shock have, unbeknownst to the designers, accommodated and therefor masked, mechanically produced vibration on the brake control valve which can produce undesired minimum (UDM) service braking.

With the introduction of aluminum and other building materials as well as the modification of other portions of a car of a train, the empty car gross weight has been reduced from the range of 55,000 to 65,000 lbs. to 40,000 to 45,000 lbs. For these lighter cars, it has been noticed that the control brake valves have been experiencing an undesired minimum service application. Initially, only longitudinal forces were investigated as the source of vibration. Upon further investigation by the applicant, it has been determined that the lighter cars have a greater natural frequency of vibration than the previous cars and this increase in vibration has placed the control valve under greater G-forces for these same longitudinal G-forces. For the previously constructed cars in the empty load condition, the natural frequency was in the range of 40 to 50 Hertz while the new lighter cars have a natural frequency in the range of 80 to 100 Hertz. With a car's natural frequency of approximately 85 Hertz and a service piston's natural frequency of approximately 170 Hertz, the piston's natural frequency is the second harmonic of the car's natural frequency. Thus both shock and frequency of the shock must be taken into account.

Experimentation has shown that the undesired minimum service application is a function of the horizontal G-forces and its duration. For a low horizontal G-force in the range of 5 to 7 Gs, typical duration of 2.6 to 2.7 milliseconds generally does not produce an undesired minimum service application. For larger residual durations, larger vertical G-forces result during the residual 4.6 milliseconds of 5.2 milliseconds producing undesirable minimum service brake application. The applicants have observed vertical acceleration produced by horizontal impact in the range of approximately plus and minus $\pm 15$ Gs.

The applicant has observed for this increased vertical force, that the differential motion between the service piston and the housing will cause the service piston to operate the quick service chamber check valve in the downward motion of the oscillating valve. This opening, even though for short periods of time, has been sufficient to trigger a minimum service application. Thus in addition to the previously recognized horizontal buff and draft forces, the control valve is also subjected to significant vibration and vertical shock components during slack action.

Thus as an object of the present invention is to provide a service valve which is insensitive to mechanically produced vibrations.

Another object of the present invention is to provide a brake control valve having a service section which is insensitive to mechanically produced vibration while not detrimentally affecting the operation time of the brake control valve.

A still even further object of the present invention is to provide a brake control valve which is insensitive to mechanically induced forces with a minimum modification to the existing designs.

These and other objects are achieved by providing, in a series with a first inlet valve of quick brake volume, two different rates of flow restrictions operable as a function of the position of the piston. The first flow rate of one first restriction is insufficient to cause the piston to apply a minimum service application for first range of piston positions which would generally be produced by the mechanical vibration. The second restriction has a greater flow and will accelerate the piston to a braking position for a second range of piston positions which will be produced by the reduction of the brake pipe pressure on one face of the piston. By providing two flow rates, the valve becomes insensitive to mechanically produced forces while maintaining the reaction time of the valve to fluidically produced reduction of brake pipe pressure. The control of the restriction, as a function of the displacement of the piston, accommodates for mechanical displacement instead of for differential pressure as in the other stability and sensitivity devices in the brake control valve.

A bore adjacent to and connected to the first valve receives an actuator which connects the piston and the first valve. In a first embodiment, the first and second restrictions are defined by the space between the bore and first and second portions respectively of the actuator. During some or all of when the first portion is in the bore, the second portion may also be in the bore, therefore the first and second restrictions are considered in series fluidically. In the second embodiment, the first restriction may also be produced by the space between the bore and an actuator and the second restriction by a passage in the actuator connecting the brake pipe pressure to a first port on the actuator to a second port of the actuator in the first portion of the actuator, such that the passage defines a second flow rate operating in parallel to the first restriction for the second range of piston positions. In either embodiment, the first and second restrictions connect the brake pipe side of the piston to the first valve. The actuator is connected to the piston by a mechanism which allows the actuator to freely align to the bore. The first valve preferably is a poppet valve. A third restriction may be provided having a greater rate of flow than the second restriction such that the second rate of flow may be a transition rate of flow.

The brake control valve in the service section includes a second valve, interconnected to the first valve or the quick service inlet valve of the quick service chamber, for providing air pressure to the brakes when open. The second valve is opened subsequent to the first range of piston positions and subsequent to at least a second range of piston positions wherein the first and second restrictions respectively are operative. A biasing mechanism is also provided to bias the piston toward the braking position. The biasing structure applies a first force insufficient to cause the piston to assume the braking position for the first range of piston positions and has a second force greater than the first force to accelerate the piston to its braking position for a range of piston positions subsequent to the first range and prior to range of positions which opens the second or braking valve.

Other objects, advantages and novel features of the present invention will become apparent from the following detailed description of the invention when considered in conjunction with the accompanying drawings.

DETAILED DESCRIPTION OF THE DRAWINGS

Figure 1:
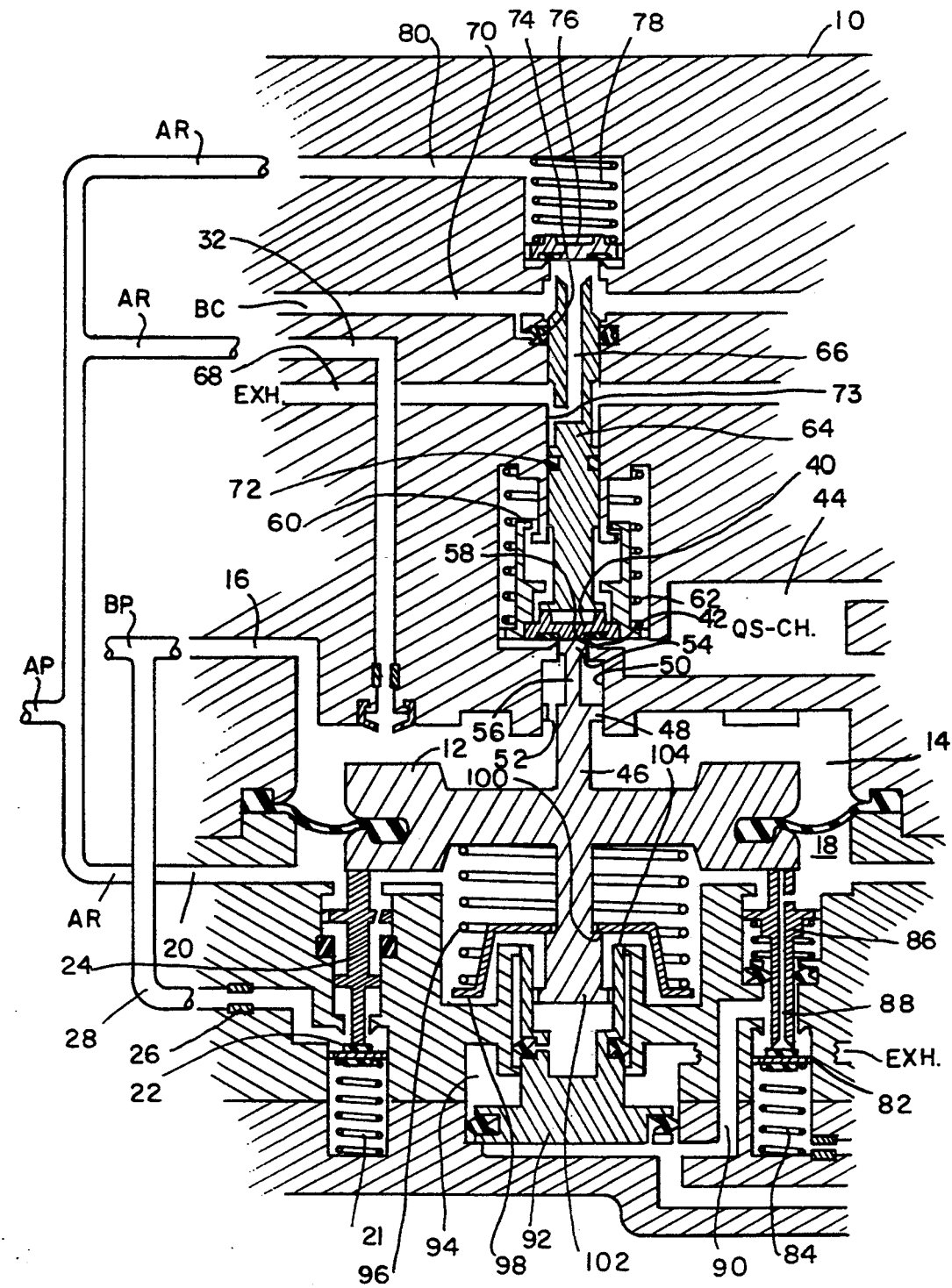
FIG. 1 is a schematic view of a portion of a service portion of a brake control valve in the charging lap position according to the principles of the present invention.

The present invention is being described with respect to an improvement on a DB-60 control valve available from New York Air Brake a unit of Knorr Brake Holding Corporation of Watertown, N.Y. A detailed description of the complete DB-60 control valve is found in instruction manual MU-21 available from New York Air Brake. Although the improvement has been incorporated into the service section of the DB-60, the present improvement may be provided to any brake control valve portion which includes a piston responsive to brake pipe pressure on one side thereof. Thus, the invention may be used in other ARR styled brake control valves or non-ARR brake control valves. Only those portions of the service section of the DB-60 which explain the operation of the present invention have been included in the schematics and others have been intentionally deleted for sake of clarity.

The brake control valve includes a housing 10 having a service piston 12 with brake pipe pressure in the top chamber 14 connected to the brake pipe BP by passage 16. The bottom chamber 18 on the other side of the piston 12 is connected to the auxiliary reservoir AR through passage 20. An auxiliary reservoir charging valve 22 is controlled by the piston 12 through operator 24 and includes spring 21. The auxiliary reservoir charging valve 22 is connected to the brake pipe BP by sensitivity choke 26 in passage 28. A stability choke 30 connects the brake pipe chamber 14 on the top of diaphragm 12 to the auxiliary reservoir AR by passage 32. Where as the sensitivity choke 26 interconnects the two chambers 14 and 18 of the piston 12 as long as the auxiliary reservoir charging valve 22 is open, the stability choke 30 interconnects the two chambers 14, 18 for all service positions of the service piston 12 and is closed off in the emergency position of the service position 12. The restrictions 26 and 30 define the sensitivity of the service position 12 against pneumatic noises in the brake pipe.

A quick service inlet valve 40 includes a seat 42 and connects the top or brake pipe chamber 14 of piston 12 to the quick service chamber 44. Operator 46, extending from the service piston 12, includes a guide portion 48 moving within bore 50 of the housing. A passage 52 in the guide 48 connects the brake pipe chamber 14 of the piston 12 to the bore 50. A smaller bore 58 connects bore 50 to the valve seat 42. The operator 46 includes an actuator having a first portion 54 of a first cross-sectional area and a second contiguous portion 56 of a second cross-sectional area smaller than the first cross-sectional area 54. The first portion 54 engages the quick service inlet valve 40. Portion 54 and 56 define restrictions between themselves and the bore 58. As will be explained more fully below, the restriction formed by 54 is sufficiently small so as to minimize the flow to the quick service chamber 44 whereas the restriction formed between bore 58 and portion 56 permits a flow rate to provide normal operation of the quick service inlet valve 40.

The cross-section of the portion 54 and 56 of the actuator have been exaggerated in the drawings to illustrate the present invention. For example, the bore 58 would have a diameter of approximately 5.02 millimeters, the first portion 54 would have a diameter of 4.92 millimeters and the portion 56 would have a diameter of 4.69 millimeters. The effective length of the first section 54 would be approximately 1.5 millimeters (2.0 millimeters less 0.5 millimeters of the valve seat 42). Thus, for the first 1.5 millimeters of travel of the piston 12 during the opening of the quick service inlet valve 40, the flow through the open valve 40 is defined by the restriction between the first portion 54 and the bore 58 and, for the remainder of the travel of the piston 12, the flow is defined by the restriction between the second portion 56 and the bore 58. This design provides 75 percent less annular area during the initial 1.5 millimeters of travel and 140 percent more annular area during subsequent travel than the standard design. As will be explained below, the restriction between portion 54 and portion 58 is selected to be insufficient to reduce the brake pipe pressure in chamber 14 to cause the piston 12 to become unstable and assume a braking position.

Figure 8:
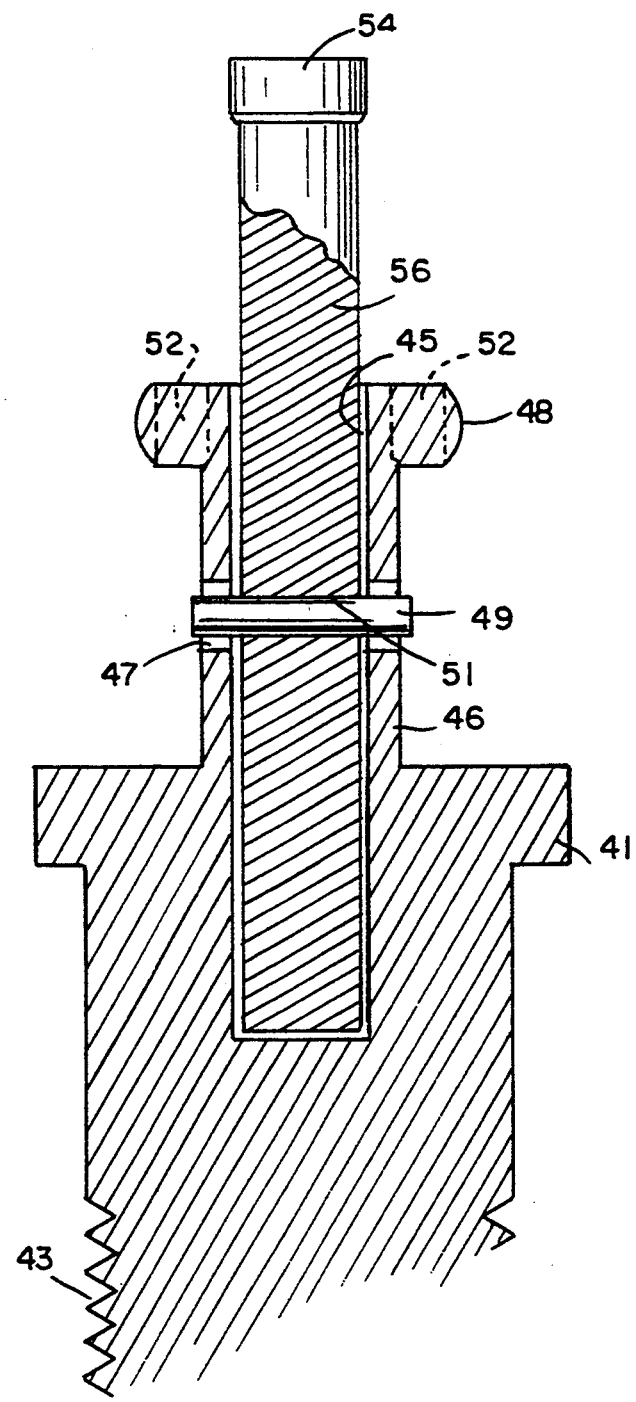
FIG. 8 is a cutaway view of the connection of an actuator.

An enlarged view of the operator 46 is illustrated in FIG. 8. Shoulder 41 of operator 46 receives the plates of the diaphragm 12 which are secured thereto by a nut, not shown, which is received on the threaded portion 43 of operator 46. A bore 45 in operator 46 receives the actuator having the portions 54 and 56. The diameter of the bore 45 is greater than the diameter of the portion 56 such that the actuator and the first portion 54 freely align within the bore 58 which defines the restrictions. A cross bore 47 in the actuator 46 and bore 51 in the actuator receive a pin 49. This maintains the actuator within the operator 46 during assembly. The end of actuator portion 56 rests at the bottom of the bore 45. Therefore, there is no longitudinal motion therebetween during operation. In prior art devices, the actuator and the operator are one continuous piece. With the reduced dimension between the first portion 54 and the bore 58, the free connection allows appropriate alignment so as to maintain the required restrictions. The actuator having portions 54 and 56 is permanently lubricated with an electroless nickel, impregnated with teflon.

A spring cage 60 connects a spring 62 to the quick service inlet valve 40 and biases it closed. A slide 64 is operatively connected to the quick service inlet valve 40, and includes a passage 66, which in FIG. 1 connects exhaust EXH through passage 68 in the housing to the brake cylinder by passage 70 in the housing. O ring 72 and K ring 74 on the slide 64 seals the slide in the bore 73 of the housing. A brake cylinder inlet valve 76 including spring 78 connects the brake cylinder passage BC 70 to the auxiliary reservoir via passage 80. The slide 64 operates the brake cylinder valve 76 in response to the quick service inlet valve 40.

A balancing valve 82 with spring 84 includes an operator 86 which is controlled by the service piston 12. A passage 88 in the operator 86 connects the auxiliary reservoir chamber 18 at the bottom of service piston 12 to a balancing piston 92 via passage 90, when the balancing valve 82 is closed and passage 88 is opened. The balancing piston 92 has chamber 94 on its top side connected to exhaust EXH. A spring 96 resting on spring cage 98 biases the service system 12 towards its braking position. The spring cage 98 rests on shoulder 100 of an element 102 connected to the service piston 12. An extension 104 of the balancing piston 102 will engage the spring cage 98 to change the biasing of the spring 96 to be explained below.

Except for the modification of the first portion 54 of the operator 46 to form a restriction smaller than the restriction formed by portion 56, the control valve portions described are that of the prior art described of the DB-60 control valve. In the charging lap position of FIG. 1, the auxiliary reservoir charging valve 24 is open and the balancing valve 82 is open with the passage 88 blocked. The first portion 54 lies in bore 58 and the quick service inlet valve 40 and the brake cylinder inlet valve 76 are closed. Passage 66 is open connecting the brake cylinder passage 70 to the exhaust passage 68. Both the sensitivity choke 26 and the stability choke 30 are operative.

Figure 2:
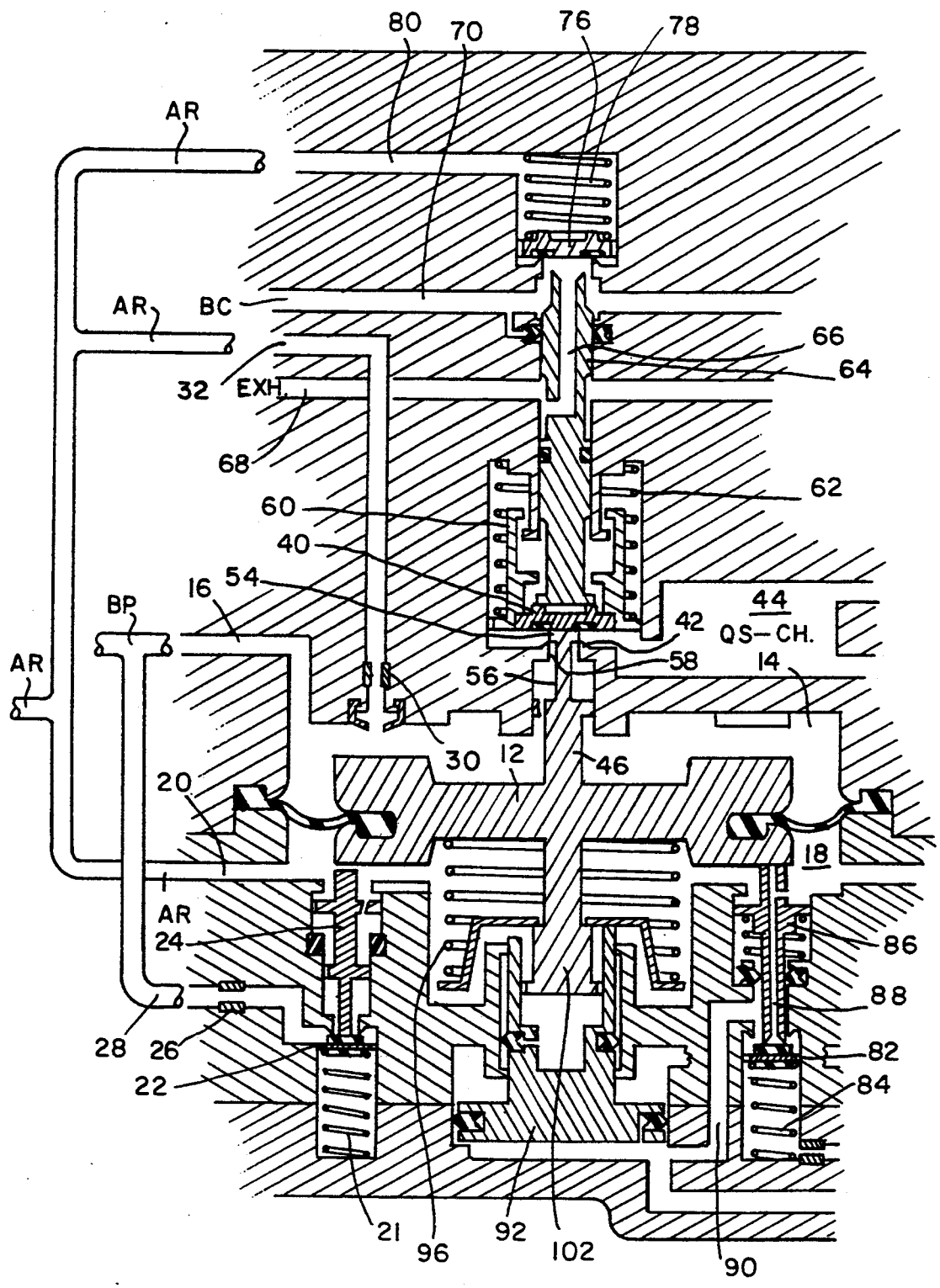
FIG. 2 is a schematic view of FIG. 1 in the first stage of quick service.

For a first portion of the quick service, as illustrated in FIG. 2, the piston 12 has moved a first range of positions equal to the length of the first portion 54 such that the portion 54 is emerging out of the bore 58. During this first range of the service piston position 12, the quick service inlet valve 40 has opened but the flow has been determined by the first restriction defined by portion 54. As the portion 54 emerges or leaves the bore 58, the auxiliary reservoir charging valve 22 begins to close. If the motion or amount of travel of the service piston 12 is produced only by the mechanical vibration, the amount of reduction of the brake pipe pressure in chamber 14 above the piston 12 is insufficient to cause the piston 12 to become unstable and reversably move toward a braking position which would open the brake cylinder inlet valve 76. Balancing valve 82 has not closed and therefore the balancing piston 92 has not moved up to change the biasing of the spring 96 on the piston 12. It is this additional biasing which causes the piston 12 to move into an unstable condition, moving irreversibly towards its braking position.

Up to this point, the stability choke 30 and the sensitivity choke 26 have been operative to balance the pressure in chambers 14 and 18 on opposite sides of the service piston 12. As auxiliary reservoir charging valve 22 closes, the sensitivity choke 24 becomes inoperative and only the stability choke 30 is operative. Thus, a drop in the brake pipe pressure at a rate greater than that defined by the stability choke 30 will cause the piston 12 to continue moving upward in response to the drop in brake pipe pressure from the brake pipe and not from any fluid flowing through the first restriction 54/58 of the open quick service inlet valve 40.

Figure 3:
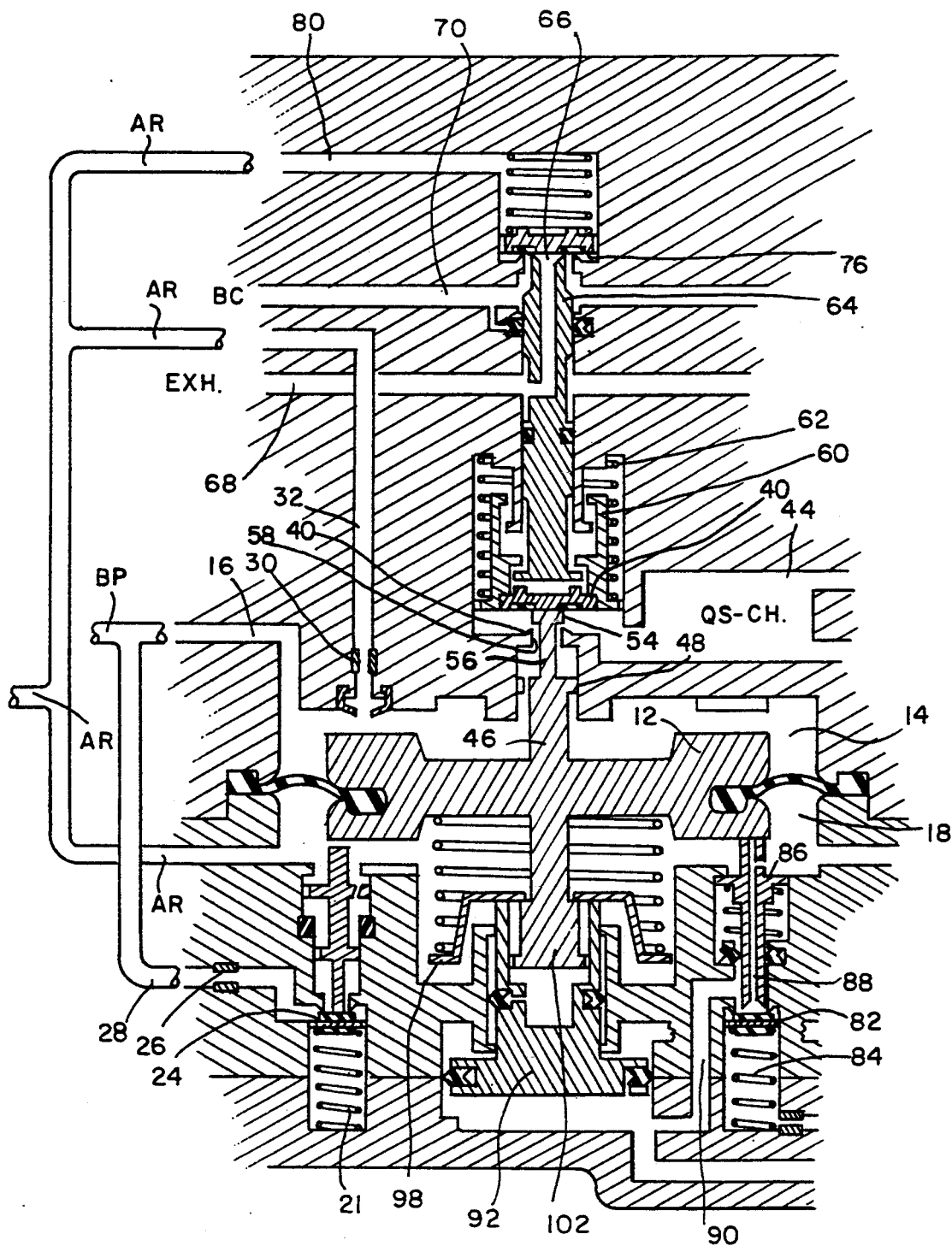
FIG. 3 is a schematic view of FIG. 1 in a second stage of quick service.

A second quick service stage, as illustrated in FIG. 3, is produced by the drop in the brake pipe pressure in chamber 14 at a greater rate than sensitivity choke 30. This causes the brake pipe pressure in chamber 14 to flow into the quick service chamber 44 through the restriction defined by portion 56 and the bore 58 through the open quick service inlet valve 40. The auxiliary reservoir charging valve 22 is completely closed and balancing valve 82 is closed and passage 88 has been opened. This allows auxiliary reservoir in chamber 18 to flow through passages 88 and 90 to the bottom of the balancing piston 92 causing it to move up and engage the spring cage 98 and increase the biasing of spring 96 to accelerate the response of the service piston 12 towards its braking position. This causes the service position 12 to become unstable and irreversibly move towards its braking position. The reduction of the brake pipe pressure in chamber 14 into the quick service chamber 44 and the increase of the tension on spring 96 are two feedback signals which cause the instability of the service position 12 to cause it to irreversibly move towards its braking position.

Figure 4:
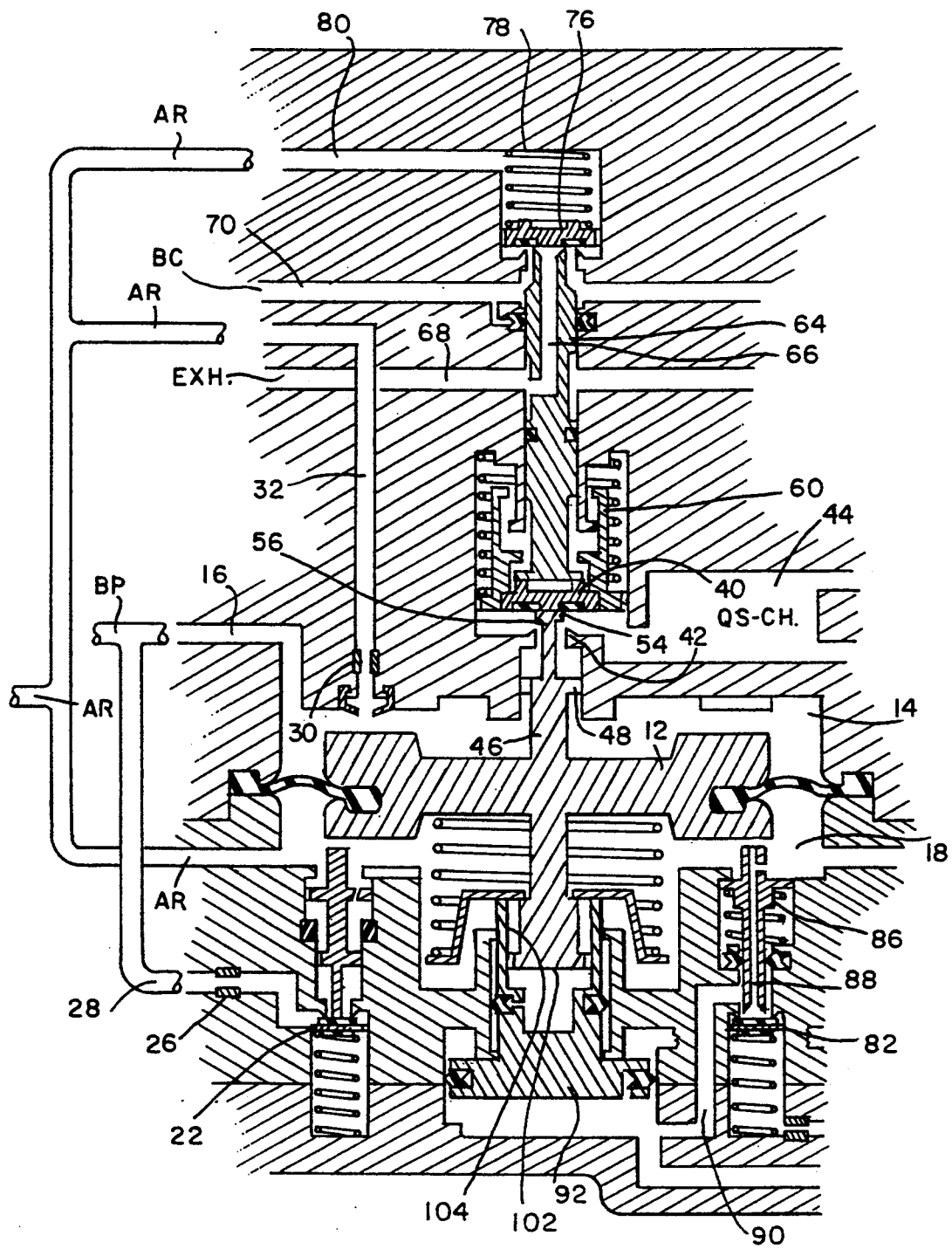
FIG. 4 is a schematic view of FIG. 1 in a service application.

Also in the second stage of the quick service of FIG. 3, slide 64, under the influence of brake pipe pressure, moves off spring cage 60 and comes into contact with the brake cylinder inlet valve 76 closing off passage 74, and thereby disconnecting the brake cylinder passage 70 from the exhaust passage 68 without opening the valve 76. With continued upward movement of the service piston 12, the quick service inlet valve 40 continues to move up forcing slide 64 to open brake cylinder valve 76 connecting the auxiliary reservoir passage 80 to the brake cylinder passage 70 as illustrated in FIG. 4.

A valve constructed according to the embodiments of FIGS. 1–4 has been tested and has shown an insensitivity or resistance to vertical shocks up to 15 Gs for residual pulse durations of 4–6 milliseconds. Tests on a 75 car test rack indicates no loss of transmission time at pressures from 70 to 90 psi of brake pipe. Thus, the use of a smaller restriction of 54 during a first small portion of the travel during the opening of the quick service inlet valve 40 does not affect the transmission time or the response of the control valve to a brake pipe pressure while providing insensitivity and stability to vibration induced motion of the service piston 12. The increased cross-section 54 may be produced on existing equipment by adding a cap to the operator 46. Although two different cross-sections or restrictions have been shown for operator 46 as portion 54 and 56, three different cross-sections may be used such that there would be a transition stage between 54 and 56. In that 54 and 56 are both in the bore 58 during some portion of their travel simultaneously, these restrictions are in series fluidically. The flow through the bore 58 is defined by the smallest flow rate of the two restrictions.

Figure 5:
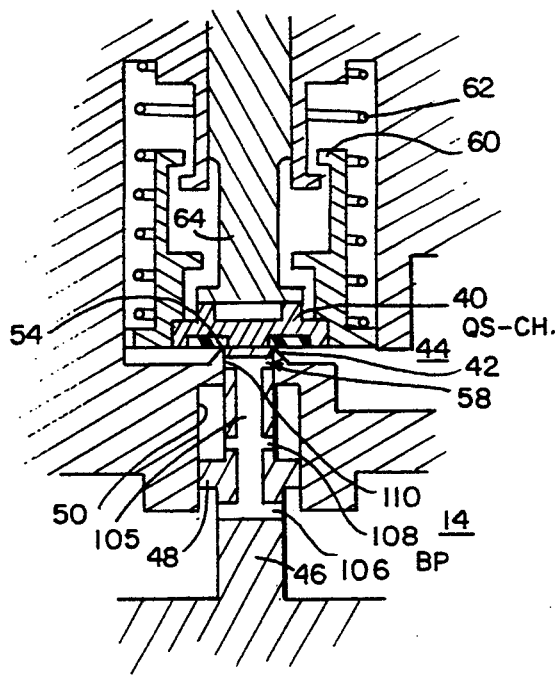
FIG. 5 is a blown-up view of a second embodiment of the invention in the charging lap position.
Figure 6:
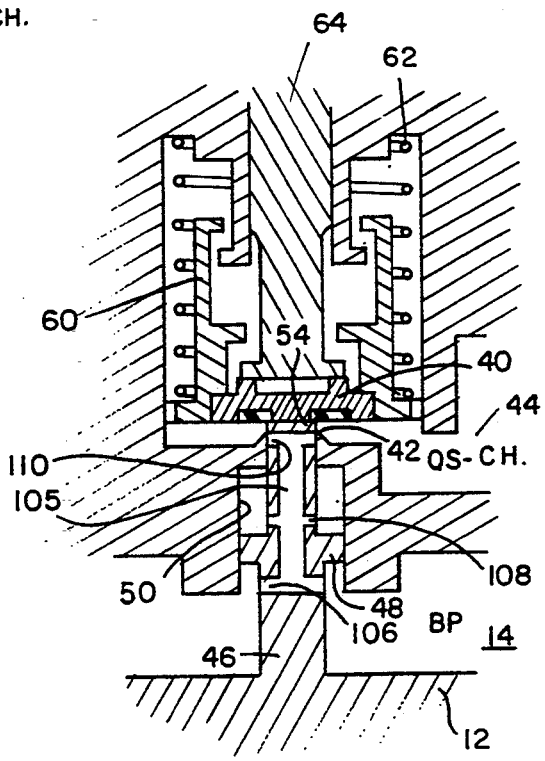
FIG. 6 is a schematic of FIG. 5 of the second embodiment in a first stage of quick service.
Figure 7:
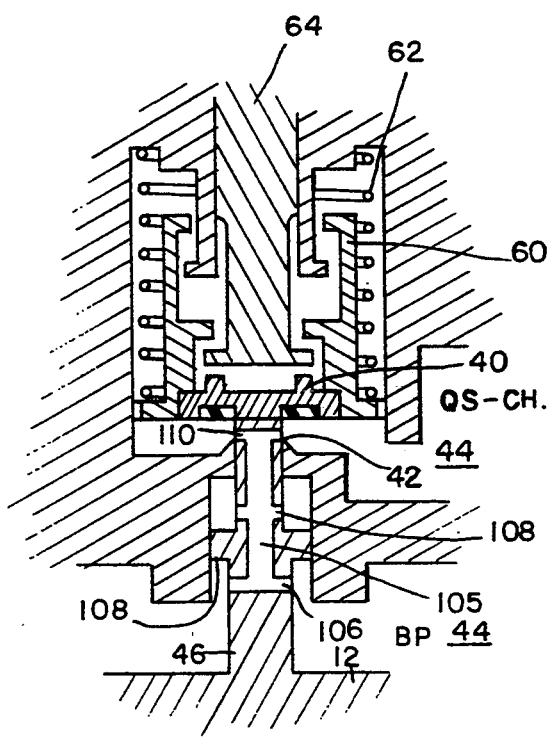
FIG. 7 is a schematic of FIG. 5 of the second embodiment in a second stage of quick service.

The connections of the two restrictions in parallel fluidically is illustrated in a second embodiment of FIGS. 5-7. Only those portions of the operator 46 to be modified to provide the two restrictions are shown. The actuator 46 includes the first portion 54 having the same dimension as the first portion in FIGS. 1-4 to define the first restriction having a rate of flow sufficient to reduce the brake pipe pressure in chamber 14 alone to cause the piston 14 to assume a braking position. The second restriction at the second rate of flow is defined by a passage 105 in the operator 46 which connects a port 110 adjacent to the top of the operator 46 with a lower port 108 opening into bore 58. The brake pipe pressure in chamber 14 is connected to the bore 58 by port 106 below the guide 48. As distinguished from FIG. 1, the guide 48 is solid and does not include the passage 52. The range of positions of the piston 12 that the first restriction is operative is defined by the distance that the port 110 is from the end of the operator 46. If a passage 52 is provided in the guide 48 in the second embodiment, the port 106 would be eliminated and the port 108 and 110 would be the only ports connected to the internal passage 105.

In the charging lap position of FIG. 5, the quick service inlet valve 42 is closed and port 110 is blocked. During a first quick service range of travel of the piston 12 as illustrated in FIG. 6, the quick service inlet valve 40 is opened and the port 110 is closed. Thus the flow from the brake pipe chamber 14 to the quick service chamber 44 is defined by the first restriction defined by the first portion 54 and bore 58. In the second stage of quick service, as illustrated in FIG. 7, the service piston 12 is in its second range of positions wherein the port 110 is out of the bore 58 and completely opened. This allows flow of the brake pipe from chamber 14 to the quick service chamber 44 at a rate defined by passage 105 and ports 106, 108 and 110. Since port 110 is in effect a spool valve, it offers a third range or transition as it slowly becomes unblocked as it leaves the bore 58. This would increase the reaction of the service piston 12 to a service reduction of the brake pipe pressure without adversely affecting the stability or insensitivity to vibration induced motions of the service piston 12.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control valve system operating a vehicle's air brakes in response to brake pipe pressure in a brake pipe, comprising:
   a housing including a quick braking volume;
   piston means in said housing and subject to brake pipe pressure on one side thereof for assuming a plurality of positions in response to said brake pipe pressure on said one side;
   first valve means in said housing for reducing brake pipe pressure by connecting brake pipe pressure to said quick braking volume when open to accelerate the response of said piston means to a drop in brake pipe pressure;
   operator means for controlling the opening of said first valve means in response to the position of said piston means;
   first restriction means for defining a first rate of flow through said first valve means insufficient to reduce said brake pipe pressure alone to cause said piston means to assume a braking position for a first range of first valve open positions of said piston means; and
   second restriction means for defining a second rate of flow through said first valve means greater than said first rate of flow to accelerate said piston means to said braking position for a second range of first valve open positions of said piston means subsequent to said first range of piston means positions.

2. A brake control system according to claim 1 including a bore adjacent to and connected to said first valve means and wherein said operator means includes an actuator in said bore and interconnecting said piston means and said first valve means.

3. A brake control system according to claim 2 wherein:
   said first restriction means includes said bore and a first portion of said actuator defining therebetween said first rate of flow when said first portion is in said bore; and
   said second restriction means includes said bore and a second portion of said actuator defining therebetween said second rate of flow when said second portion is in said bore.

4. A brake control system according to claim 3 wherein said first portion of said actuator has a greater cross-sectional area than said second portion of said actuator.

5. A brake control system according to claim 3 wherein said first portion is in said bore for said first range of piston means positions and out of said bore for said second range of said piston means positions.

6. A brake control system according to claim 5 wherein at least a portion of said second portion of said actuator is in said bore for said first and second ranges of piston means positions.

7. A brake control system according to claim 3 wherein said operator means includes means connecting said actuator to said piston means for freely aligning said actuator to said bore.

8. A brake control system according to claim 2 wherein said first valve means is a poppet valve having a valve seat adjacent said bore.

9. A brake control system according to claim 2 wherein:
   said first restriction means includes said bore and a first portion of said actuator defining therebetween said first rate of flow; and said second restriction means includes a passage in said actuator connecting said brake pipe pressure from a first port in said actuator to a second port in said first portion of said actuator, said passage defining said second flow rate and operates in parallel to said first restriction means for said second range of piston means positions.

10. A brake control system according to claim 1 wherein said first and second restriction means are in series fluidically.

11. A brake control system according to claim 1 wherein said first and second restriction means are in parallel fluidically.

12. A brake control system according to claim 1 wherein said one side of said piston means is connected to said first valve means by said first and second restriction means.

13. A brake control system according to claim 1 including a third restriction means for defining a third rate of flow through said first valve means greater than said second rate of flow for a third range of first valve open positions of said piston means subsequent to said second range of piston means positions.

14. A brake control system according to claim 1 including:
a second valve means for providing air pressure to said brakes when open; and
means interconnecting said first and second valve means to open said second valve means in response to said braking position of said piston means in a fourth range of second valve open positions of said piston means subsequent to said first and at least a portion of said second range of piston means positions.

15. A brake control system according to claim 14 including biasing means for biasing said piston means towards said braking position with a first force insufficient to cause said piston means to assume said braking position for said first range of piston means positions and with a second force greater than said first force to accelerate said piston means to its braking position for a fifth range of first valve open positions of said piston means subsequent to said first range and prior to said fourth range of piston means positions.

16. A brake control valve system operating a vehicle's air brakes in response to brake pipe pressure in a brake pipe, comprising:
a housing including a quick braking volume;
piston means in said housing and subject to brake pipe pressure on one side thereof for assuming a plurality of positions in response to said brake pipe pressure on said one side;
first valve means in said housing for reducing brake pipe pressure by connecting brake pipe pressure to said quick braking volume when open to accelerate the response of said piston means to a drop in brake pipe pressure;
a bore adjacent to and connected to said first valve means;
operator means, including an actuator in said bore and interconnecting said piston means and said first valve means, for controlling the opening of said first valve means in response to the position of said piston means;
first restriction means, including said bore and a first portion of said actuator defining therebetween a first rate of flow when said first portion is in said bore, for limiting the rate of flow through said first valve means to said first rate of flow which is insufficient to reduce said brake pipe pressure alone to cause said piston means to assume a braking position for a first range of first valve open positions of said piston means; and
second restriction means for defining a second rate of flow through said first valve means greater than said first rate of flow to accelerate said piston means to said braking position for a second range of first valve open positions of said piston means subsequent to said first range of piston means positions.

17. A brake control system according to claim 16 wherein said operator means includes means connecting said actuator to said piston means for freely aligning said actuator to said bore.

18. A brake control system according to claim 16 wherein said second restriction means includes said bore and a second portion of said actuator defining therebetween said second rate of flow when said second portion is in said bore.

19. A brake control system according to claim 18 wherein said first portion of said actuator has a greater cross-sectional area than said second portion of said actuator.

20. A brake control system according to claim 16 wherein said second restriction means includes a passage in said actuator connecting said brake pipe pressure from a first port in said actuator to a second port in said first portion of said actuator, said passage defining said second flow rate and operates in parallel to said first restriction means for said second range of piston means positions.

* * * * *

UNITED STATES PATENT AND TRADEMARK OFFICE
CERTIFICATE OF CORRECTION

PATENT NO. : 5,387,030

DATED : February 7, 1995

INVENTOR(S) : Robert Gayfer and Heinz-Jurgen Listl

It is certified that error appears in the above-identified patent and that said Letters Patent is hereby corrected as shown below:

Column 7, line 25, replace "sufficient" with --insufficient--;
        line 26, replace "14" with --12--;
        lines 30 and 31, replace "58" with --50--.

Figure 7, change the Legend 108 on the bottom left to 48
and change the Legend 44 on the bottom right to 14.

Signed and Sealed this

Twelfth Day of August, 1997

*Attest:*

BRUCE LEHMAN

*Attesting Officer*    *Commissioner of Patents and Trademarks*